US008210341B2

(12) United States Patent  
Marshall et al.

(10) Patent No.: US 8,210,341 B2  
(45) Date of Patent: Jul. 3, 2012

(54) CONVEYOR TRANSFER SYSTEM WITH FLOATING TRANSFER PLATFORM

(75) Inventors: Angela L. Marshall, Harahan, LA (US); Ross Doyle, Metairie, LA (US); Glenn R. McCall, Harvey, LA (US); Ed J. Pointer, New Orleans, LA (US); Brien G. Rau, Jefferson, LA (US); Dennis K. Scates, Kennesaw, GA (US)

(73) Assignee: Laitram, L.L.C., Harahan, LA (US)

( * ) Notice: Subject to any disclaimer, the term of this patent is extended or adjusted under 35 U.S.C. 154(b) by 406 days.

(21) Appl. No.: 12/633,294

(22) Filed: Dec. 8, 2009

(65) Prior Publication Data

US 2011/0132725 A1 Jun. 9, 2011

(51) Int. Cl.  
*B65G 47/66* (2006.01)

(52) U.S. Cl. ......... 198/600; 198/805; 198/834; 198/845

(58) Field of Classification Search .................. 198/600, 198/805, 83.4, 845  
See application file for complete search history.

(56) References Cited

U.S. PATENT DOCUMENTS

| | | | |
|---|---|---|---|
| 2,624,444 A | | 1/1953 | Casabona |
| 4,288,208 A | * | 9/1981 | Kusters .................. 425/371 |
| 4,613,036 A | | 9/1986 | Bourgeois |
| 5,044,485 A | | 9/1991 | Loder |
| 5,065,222 A | * | 11/1991 | Ishii .............................. 257/639 |
| 5,215,182 A | | 6/1993 | Garbagnati |
| 5,584,373 A | | 12/1996 | Layne |
| 5,597,062 A | | 1/1997 | Biwer |
| 5,695,042 A | | 12/1997 | van der Burgt et al. |
| 5,957,265 A | | 9/1999 | Clopton |
| 6,959,803 B1 | * | 11/2005 | Layne et al. .................. 198/600 |
| 7,210,569 B1 | * | 5/2007 | Tarhan et ...................... 198/599 |
| 2010/0108467 A1 | | 5/2010 | Barreyre et al. |

FOREIGN PATENT DOCUMENTS

| | | |
|---|---|---|
| DE | 3224557 A1 | 1/1984 |
| DE | 0919493 A1 | 6/1999 |
| DE | 202006003116 U1 | 4/2006 |
| EP | 0778229 A2 | 6/1997 |

OTHER PUBLICATIONS

International Search Report and Written Opinion of the International Search Authority, PCT/US10/58691, mailed Mar. 17, 2011, European Patent Office, Rijswijk, NL.  
Marbett Conveyor Components Modular Transfer Roller Plate new product data sheet, Rexnord Marbett, Corregio, Italy Jan. 2004.  
DVD-saved video of conveyor system in Rexam PLC plant, now Arnagh Glass plant, in Limmared, Sweden taken by Per-Ola Lundh of Intralox, L.L.C. circa 2004.

* cited by examiner

*Primary Examiner* — Mark A Deuble  
(74) *Attorney, Agent, or Firm* — James T. Cronvich

(57) ABSTRACT

A conveyor transfer system and a transfer platform for transferring articles from an upstream conveyor to a downstream conveyor across a gap. The transfer platform fits in the gap between two conveyors arranged end to end. At least one of the conveyors includes a conveyor belt that reverses direction around a reversing element at the gap. The transfer platform floats in the gap supported by the conveyor belt or its reversing element without a direct connection to the conveyor frame.

48 Claims, 11 Drawing Sheets

CONVEYOR TRANSFER SYSTEM WITH FLOATING TRANSFER PLATFORM

BACKGROUND

The transfer systems described relate generally to power-driven conveyors and more particularly to conveyors having transfer platforms over which articles travel between end-to-end conveyor belts.

Belt conveyors are often arranged end-to-end with a gap between the downstream end of an upstream conveyor belt and the upstream end of a downstream conveyor belt. A dead plate is conventionally positioned in the gap to provide a ride-over surface for products transferring across the gap from the upstream conveyor belt to the downstream conveyor belt. The dead plate allows a smoother product transfer between the confronting ends of the two belts, which transition at the gap from an upper carryway run to a lower returnway run around nosebars, sprockets, or pulleys. The dead plate is conventionally affixed to the conveyor frame with its upper product-transfer surface generally coplanar with the top conveying surfaces of the upstream and downstream conveyor belts. If the dead plate is vertically misaligned with one or both conveyor belts, the misalignment may provide a discontinuity that can cause products to trip. If the dead plate is horizontally misaligned, it can come into contact with one of the belts and cause wear or damage. Clearly, improperly aligned product-transfer plates can cause problems.

SUMMARY

A conveyor transfer system embodying features of the invention comprises a first conveyor including a first conveyor belt advancing articles in a conveying direction and a second conveyor arranged end to end with the first conveyor across a gap. The second conveyor advances the articles in the conveying direction. A transfer platform is disposed in the gap between the first and second conveyor belts. The transfer platform has a top transfer face that is traversed by articles transferring between the first conveyor and the second conveyor in the conveying direction. The first conveyor belt supports the transfer platform in the gap.

Another version of the conveyor transfer system comprises a first conveyor belt and a second conveyor belt. The first conveyor belt advances articles along a carryway in a conveying direction toward an exit end. The second conveyor belt has an entrance end adjacent to the exit end of the first conveyor belt across a gap. The second conveyor belt receives articles from the first conveyor belt and advances the articles along the carryway further in the conveying direction. The first conveyor belt reverses direction from the carryway to a lower returnway around a first reversing element at the exit end of the first conveyor belt. The second conveyor belt reverses direction around a second reversing element at the entrance end of the second conveyor belt from a lower returnway to the carryway. A transfer platform disposed in the gap between the conveyor belts has a transfer surface that supports the articles transferring from the first conveyor belt to the second conveyor belt. At least one of the first conveyor belt, the second conveyor belt, the first reversing element, and the second reversing element supports the transfer platform in the gap.

One version of a transfer platform comprises a top transfer face having first and second ends and a concave side face that extends downward from the first end of the top transfer face. The concave side face has a contact surface for contact with a conveyor belt reversing direction between an upper path and a lower path.

BRIEF DESCRIPTION OF THE DRAWINGS

These features of the exemplary versions are described in more detail in the following description, appended claims, and accompanying drawings, in which:

DETAILED DESCRIPTION

Figures 1, 2:
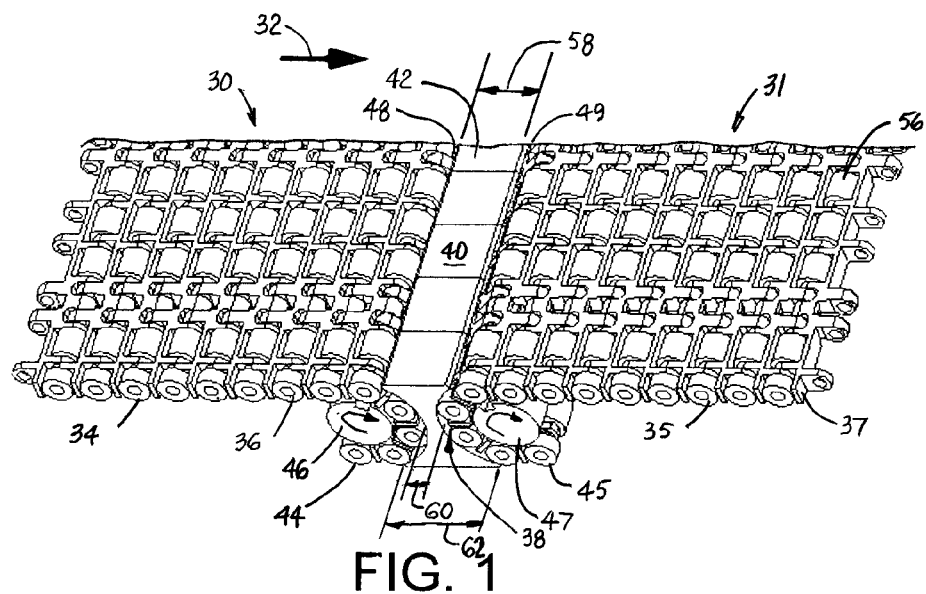
FIG. 1 is an axonometric view of one version of a conveyor transfer system having a floating transfer platform.
FIG. 2 is an axonometric view of the floating transfer platform of FIG. 1.

A portion of one version of a conveyor transfer system embodying features of the invention is shown in FIG. 1. The transfer system comprises an upstream conveyor 30 advancing articles in a conveying direction 32 along an upper carryway run 34 of an upstream conveyor belt 36. The upstream conveyor 30 is arranged end to end with a downstream conveyor 31 across a gap 38 largely filled with a transfer platform 40. The downstream conveyor 31 receives articles from the upstream conveyor 30 that traverse the transfer platform 40 and conveys them in the conveying direction 32 atop an upper carryway 35 of a downstream conveyor belt 37. A top transfer face 42 of the transfer platform is generally coplanar with the tops of the upstream and downstream conveyor belts for a smooth transfer. The upstream conveyor belt 36 reverses direction from the upper carryway 34 to a lower returnway 44 around a reversing element 46, such as sprockets or wheels mounted on a drive shaft at an exit end 48 of the upstream conveyor. The downstream conveyor belt 37 reverses direction from a lower returnway path 45 to the upper carryway 35 around a reversing element 47, such as sprockets or wheels mounted on an idler shaft at an entrance end 49 of the downstream conveyor. The upstream conveyor belt is conventionally trained around the drive-shaft reversing element 46 and an upstream reversing element (not shown). A drive motor (not shown) is conventionally coupled to the drive shaft to drive the upstream conveyor belt 36 in the conveying direction 32. The downstream conveyor belt 37 is conventionally trained around the idler-shaft reversing element 47 and a downstream reversing element (not shown). The downstream conveyor belt is also conventionally driven by a drive motor (not shown).

The transfer platform 40 of FIG. 1 is shown enlarged in FIG. 2. The transfer platform is generally hourglass-shaped with a flat top product-transfer face 42 that extends from a first end 50 to a second end 51. Concave side faces 52, 53 extend downward from the two ends of the top transfer face 42 to opposite ends of a bottom 54. The concave side faces 52, 53 of the transfer platform of FIG. 2 provide smooth arcuate surfaces that extend through an arc of between 90° and 180° and on which rollers 56 (FIG. 1) protruding from the outer sides of the conveyor belts ride in low-friction rolling contact. As shown in FIG. 1, the transfer platform 40 is entirely supported in the gap 38 by the two conveyor belts 36, 37 without an attachment to any stationary conveyor frame structure. The concave arcuate surfaces of the side faces 52, 53 match the convex circles swept by the conveyor belts articulating about their reversing elements 46, 47. Because the transfer platform floats without permanent affixation in the gap, it can self-adjust to any variations in the positions of the belts, such as caused by chordal action, wear, or changes in alignment.

The shape of the transfer platform 40 is such that the dimension 58 of its top transfer face 42 in the conveying direction 32 is greater than the narrowest dimension 60 of the gap 38 in the conveying direction. In this way, the top transfer face cannot fall through the gap. Similarly, the dimension 62 of the bottom 54 in the conveying direction is greater than the smallest dimension 60 of the gap. In this way, the transfer platform is captured in the gap by the two confronting conveyor belts. Because the curvature of the side faces 52, 53 matches the belts' circles around the reversing elements, the belts support the transfer platform 40 with its top transfer face 42 generally coplanar with the tops of the belts.

Figure 3A:
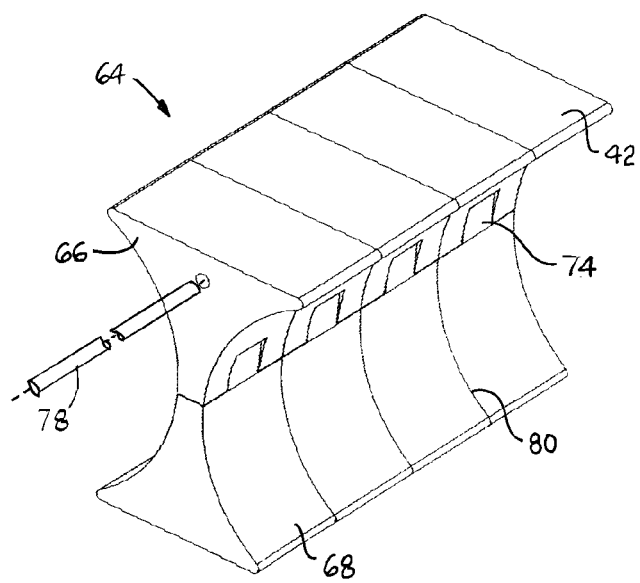
FIGS. 3A, 3B, and 3C are axonometric views of a transfer platform as in FIG. 2 made of multiple pieces.
Figure 3B:
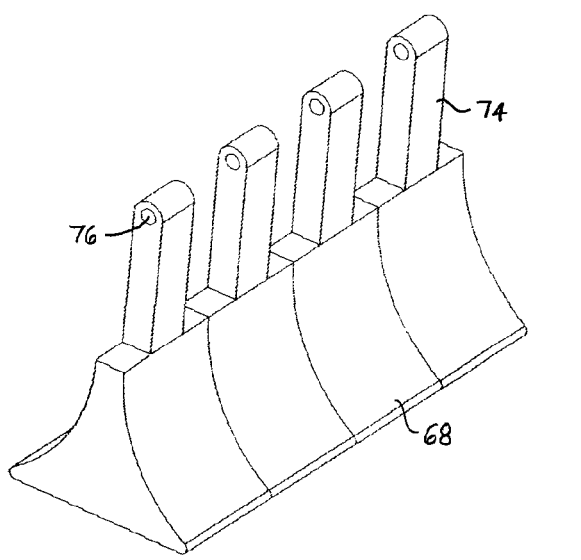
Figure 3C:
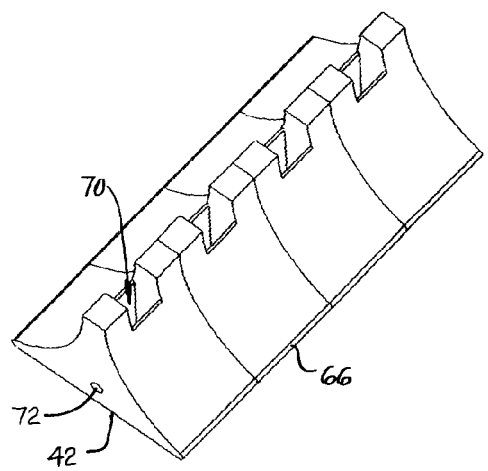

Another version of the transfer platform is shown in FIGS. 3A-3C. In this version, the transfer platform includes a pair of detachable portions: a top portion 66 and a bottom portion 68. The top portion 66 includes the top transfer face 42 and resides in the upper portion of the gap 38 between the two conveyors. The bottom portion 68 resides in the bottom half of the gap opposite the top portion. The top portion includes receptacles 70 that communicate with a pin hole 72 that extends laterally across the width of the platform. Legs 74 extending from the top of the bottom portion 68 are sized to be received in the receptacles 70 in the top portion 66. The distal ends of the legs 74 have holes 76 that align with the pin holes 72 when the legs are inserted in the receptacles. A connecting pin 78 through the pin hole and the holes in the legs holds the two portions of the transfer platform 64 together. This two-piece transfer platform may be easily removed from or installed in the gap when the pin is removed. The one-piece version 40 in FIG. 2, on the other hand, must be inserted into and removed from the gap only from one of the sides of the conveyor system. As indicated by seams 80, either the one-piece or the two-piece transfer platform may be formed of modular sections, like section 81 in FIG. 2, held together at the seams by bonding or fasteners. The modular construction makes it easy to gang modules together to make transfer platforms of many widths with a single, smaller mold than for monolithic platforms, which could also be used.

Figure 4A:
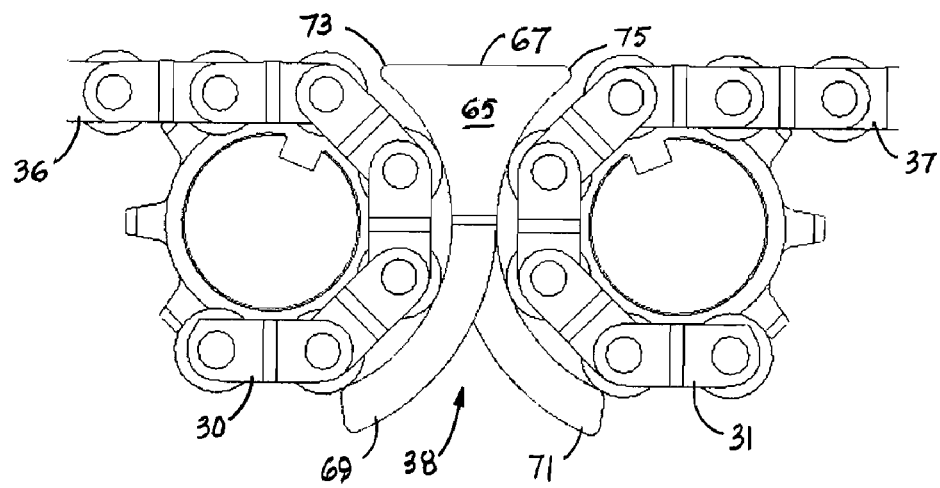
FIGS. 4A and 4B are side elevation views of a conveyor transfer system as in FIG. 1 with another version of a transfer plate, including retractable legs in relaxed and retracted positions.
Figure 4B:
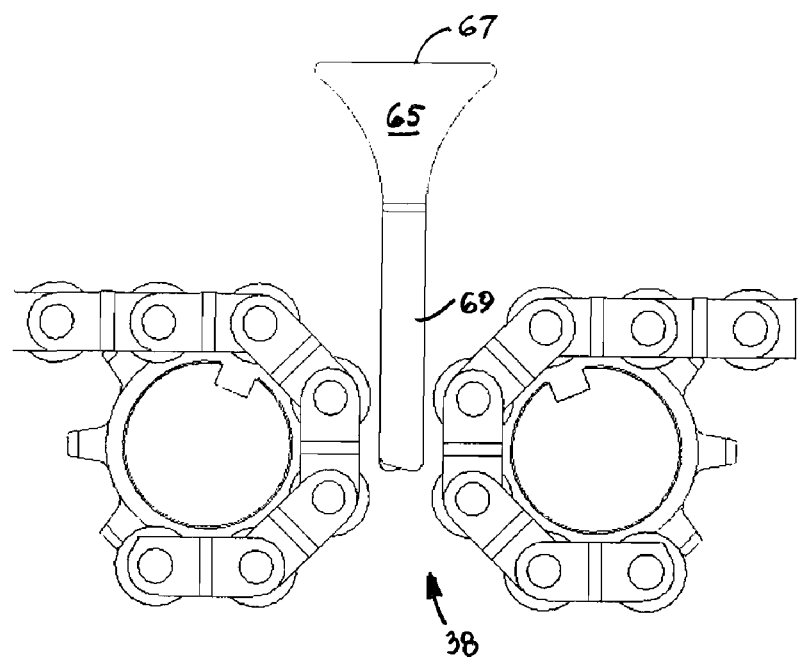

Another version of a transfer platform is shown in FIGS. 4A and 4B. The transfer platform 65 has a top article transfer face 67 and a set of bendable legs 69, 71 extending downward opposite to the top transfer face. In the relaxed position of the legs shown in FIG. 4A, alternate legs 69, 71 curve in opposite directions under upstream and downstream ends 73, 75 of the top transfer face toward the upstream and downstream conveyors 30, 31. The oppositely curving legs retain the transfer platform in place in the gap 38 by contact with the upstream and downstream conveyor belts 36, 37. The legs 69, 71 may be made out of a durable, resilient material that holds its curved shape under pressure from the conveyor belts, but which may be bent manually, as shown in FIG. 4B, into a vertical retracted position to remove the transfer platform from or insert it into the gap 38 from above.

Figure 5:
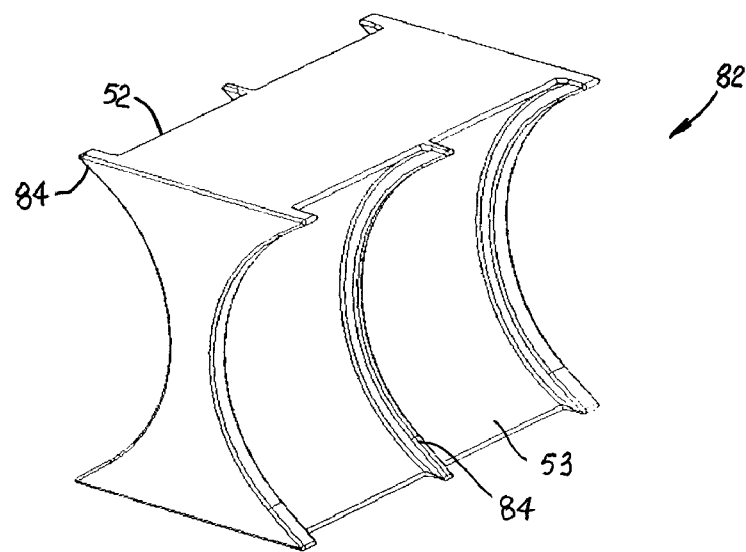
FIG. 5 is an axonometric view of another version of a transfer platform usable in the conveyor transfer system of FIG. 1, including arcuate ribs along a side face of the platform.

Another version of a transfer platform is shown in FIG. 5. This platform 82 differs from the previously described platforms in that the concave arcuate side faces 52, 53 include arcuate ribs 84 extending from top to bottom. The ribs fit in the recesses between the lanes of rollers 56 on the conveyor belts 36, 37 to limit the lateral wander of the floating transfer platform along the gap. In other words, the ribs help maintain the lateral position of the transfer platform in the gap, while the shape of the concave side faces in contact with the conveyor belts helps maintain the vertical position.

Figure 6:
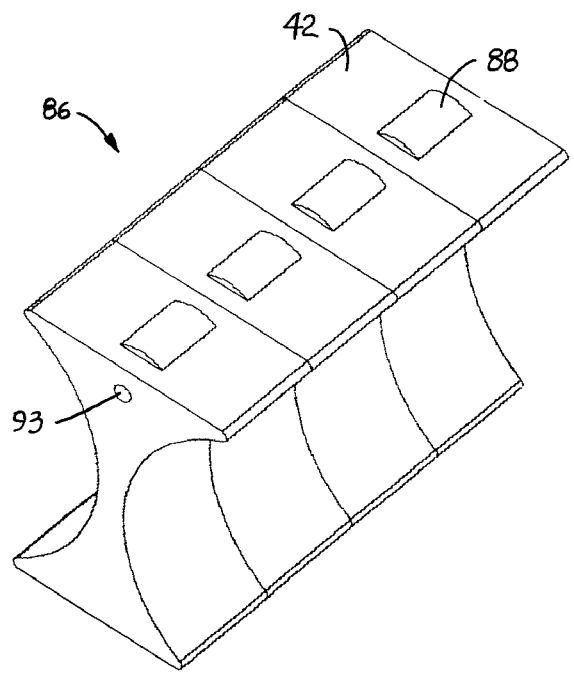
FIG. 6 is an axonometric view of another version of a transfer platform usable in the conveyor system of FIG. 1, including transfer rollers.
Figure 7:
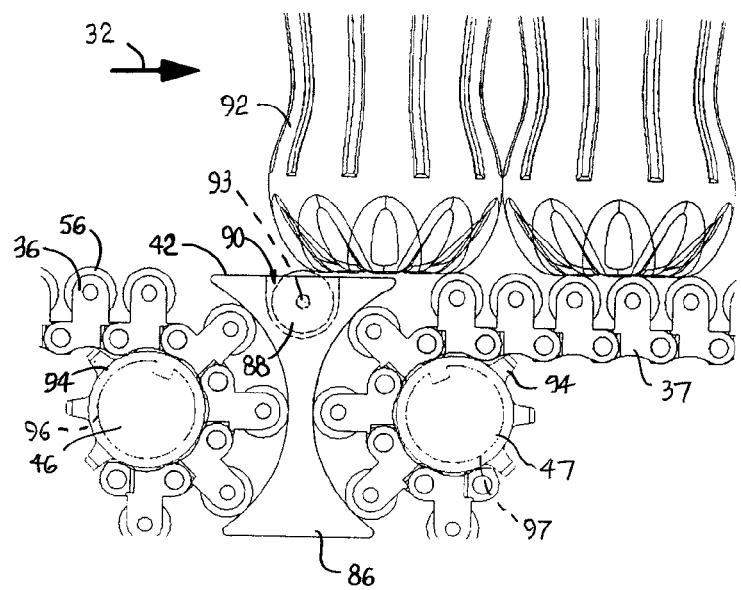
FIG. 7 is a side elevation view of a transfer conveyor system as in FIG. 1 with the floating transfer platform of FIG. 6.

Another version of a transfer platform is shown in FIGS. 6 and 7. The transfer platform 86 has a plurality of rollers 88 residing in recesses 90 opening onto the top transfer face 42 of the platform. Salient portions of the rollers protrude beyond the top transfer face to provide a rolling support and contact surface for articles 92 traversing the top face as they advance from one belt 36 to the other 37. The rollers rotate in the conveying direction 32 on individual axles 93 or on a continuous axle that extends across the width of the transfer platform. The tops of the platform rollers 88 are maintained generally coplanar with the tops of the belt rollers 56 in the two conveyor belts. FIG. 7 also depicts more details of the reversing elements 46, 47. In particular, the reversing elements include toothed sprockets 94 mounted on drive and idler shafts 96, 97.

Figure 8:
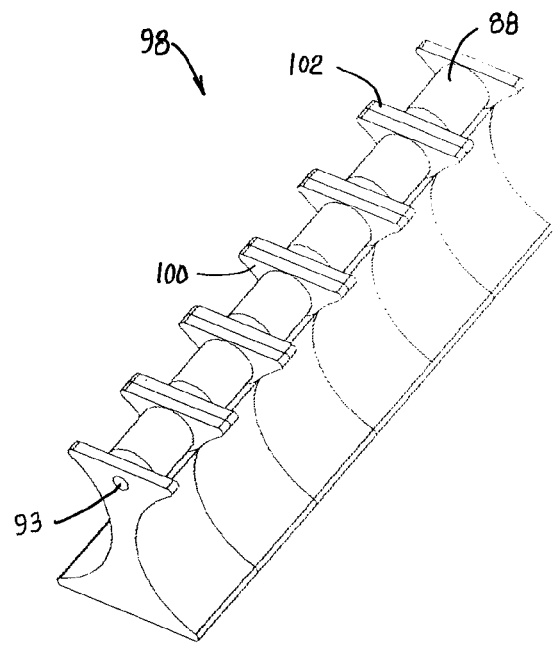
FIG. 8 is an axonometric view of yet another version of a transfer platform usable in the conveyor transfer system of FIG. 1, including transfer rollers and a segmented top face.

The version of transfer platform 98 shown in FIG. 8 has a plurality of rollers 88 mounted on individual axles or one continuous axle 93. The axle or axles are supported in stanchions 100 having top surfaces 102 that form a discontinuous top transfer face of the transfer platform. Salient portions of the rollers extend above the top surface 102 of the stanchions to form a transfer surface in contact with articles traversing the transfer platform.

Figure 9:
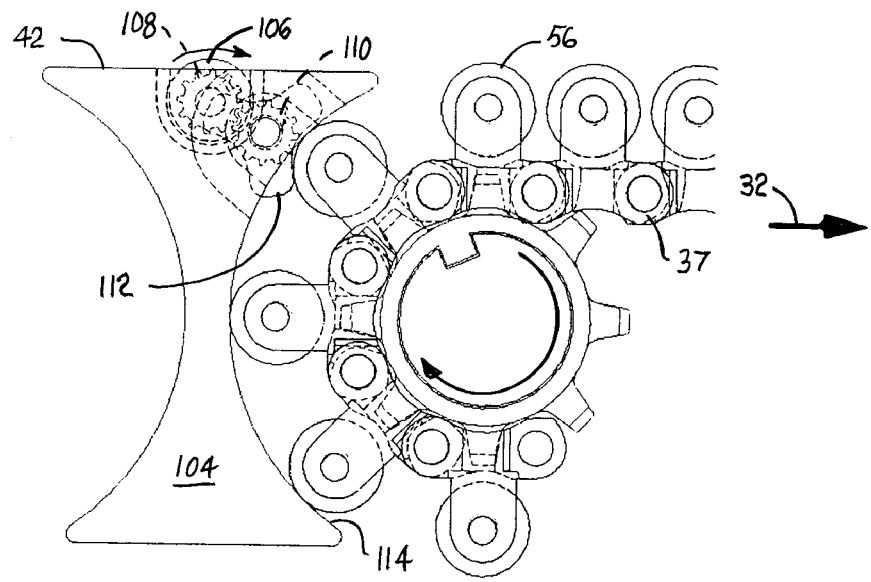
FIG. 9 is a side elevation view of a portion of a conveyor transfer system as in FIG. 1 with a floating transfer platform having transfer rollers driven by a conveyor belt.

A transfer platform having actively driven article-supporting rollers is shown in FIG. 9. Instead of having passive rollers as in FIGS. 6-8, the transfer platform 104 of FIG. 9 has an article-supporting roller 106 protruding above the top transfer face 42 of the platform. The roller 106 or a series of rollers are coaxially arranged to rotate with a roller gear 108. The roller gear is engaged by a cam gear 110 coaxially arranged to rotate with a lobed cam 112. The cam lobes protrude slightly outward of a side face 114 of the transfer platform 104. As the downstream conveyor belt 37 advances along the carryway in the conveying direction 32, the belt rollers 56 riding along the side face 114 push on the protruding lobe of the cam to rotate the cam in the cam gear 110 counterclockwise in FIG. 9, which rotates the roller gear and the transfer roller 106 clockwise to roll supported articles across the transfer platform and onto the downstream conveyor belt 37 in the conveying direction 32. The driven transfer rollers also help prevent the final articles in a flow from stranding atop the transfer platform.

Figure 10:
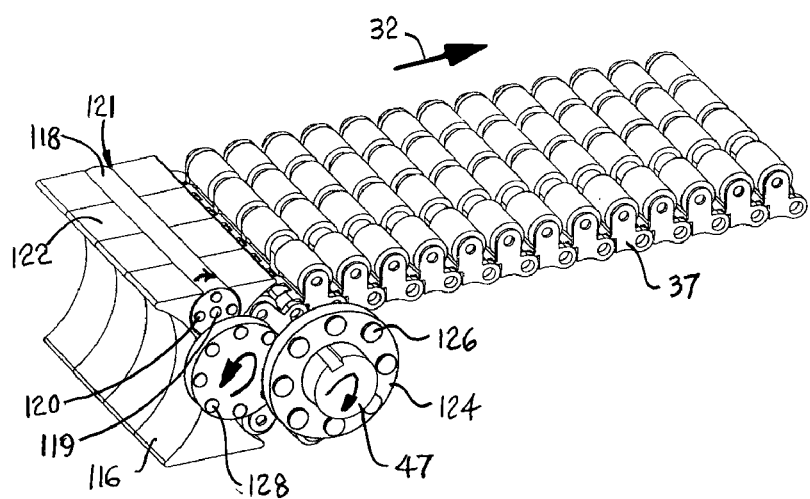
FIG. 10 is an axonometric view of a portion of a conveyor transfer system as in FIG. 1 with a floating transfer platform having a magnetically driven transfer rollers.

Another version of a transfer platform with driven rollers is shown in FIG. 10. In this version, the transfer platform 116 has an elongated roller 118 mounted on an axle 119 with magnets 120 embedded in an end of the roller. The elongated roller fits in an elongated recess 121 that opens onto a flat top face 122 of the platform. The platform's top face, being divided by the elongated recess, is discontinuous. A salient portion of the roller 118 protrudes above the top transfer face. A rotor 124 with a ring of magnets 126 is mounted to the idle shaft 47 of the downstream conveyor belt 37. As the downstream conveyor belt advances in the conveying direction 32, the rotor 124 rotates clockwise in FIG. 10 as indicated. The rotating ring of magnets 126 induces an intervening rotatable ring of magnets 128 to rotate counterclockwise as indicated, which induces the transfer roller 118 to rotate clockwise as indicated and push the supported articles in the conveying direction 32.

Figure 11:
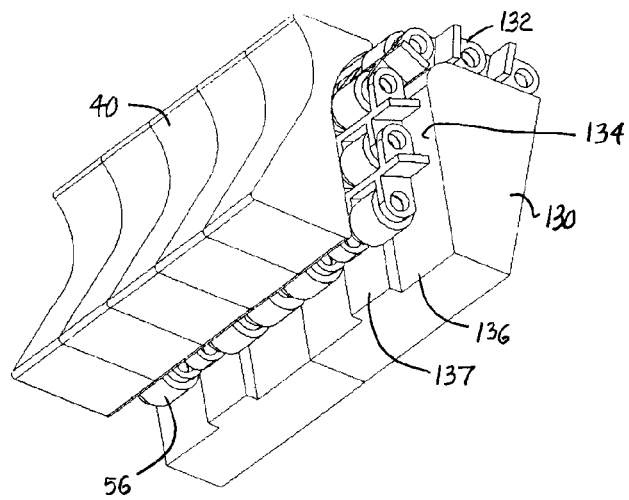
FIG. 11 is an axonometric view of the transfer portion of another version of a conveyor transfer system including a nosebar and a flat-top transfer platform.

Another version of a reversing element is shown in FIG. 11 with a transfer platform 40 as in FIG. 2. In this example, the reversing element is a stationary nosebar 130 around which an upstream or downstream conveyor belt 132 wraps. A face 134 of the nosebar facing the transfer platform has alternating grooves 136 and ridges 137. The lanes of belt rollers 57 ride in the grooves, and the ridges limit the lateral motion of the belt. In this way, the nosebar keeps the belt on track.

Figure 12:
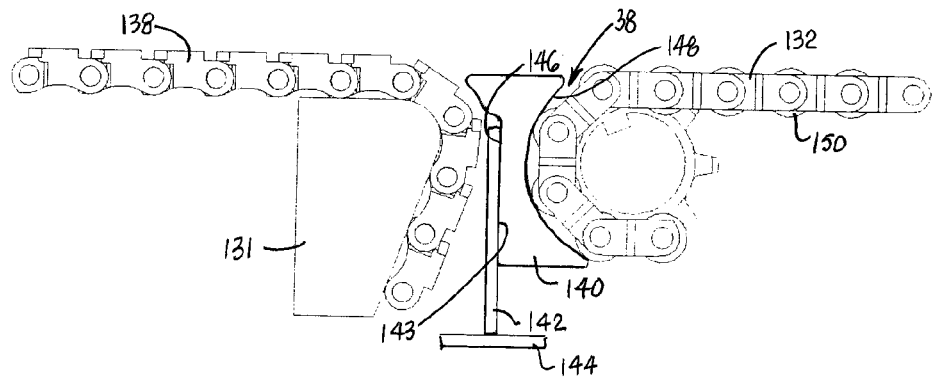
FIG. 12 is a side elevation view of yet another version of a conveyor transfer system, including one conveyor belt articulating about sprockets and another belt articulating about a nosebar and including a floating transfer platform having an outer wall registered against a plate.
Figure 13:
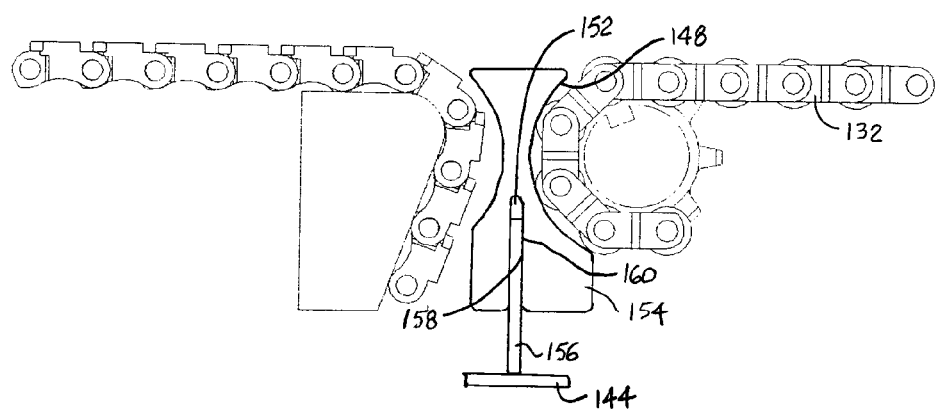
FIG. 13 is a side elevation view as in FIG. 12, but with a transfer platform having a slot for receiving a registration plate.

A transfer system using a nosebar 131 as in FIG. 11, but without grooves and ridges, is shown in FIG. 12 with a rollerless conveyor belt 138 on one side of a transfer platform 140 and a roller belt 132 on the opposite side. A vertical plate 142 attached to the conveyor frame 144 forms a stationary wall 143 against which a vertical registration surface 146 of the transfer platform 140 can slide. The concave arcuate side face 148 of the platform facing the roller belt 132 provides the belt rollers 150 with a surface on which they can roll. The transfer plate is allowed to float in position in the gap 38 held adjustably in place between the roller belt 132 and the wall 143. A similar arrangement is shown in FIG. 13. In this example, a vertical groove 152 opening onto the bottom of the transfer platform 154 receives a plate 156 attached to the conveyor frame 144. The side of the groove closer to the concave side face 148 of the roller belt 132 forms a registration surface 158 that can slide along the wall 160 provided by the plate. The groove is deep enough to allow for vertical motion of the platform along the plate.

Figure 14:
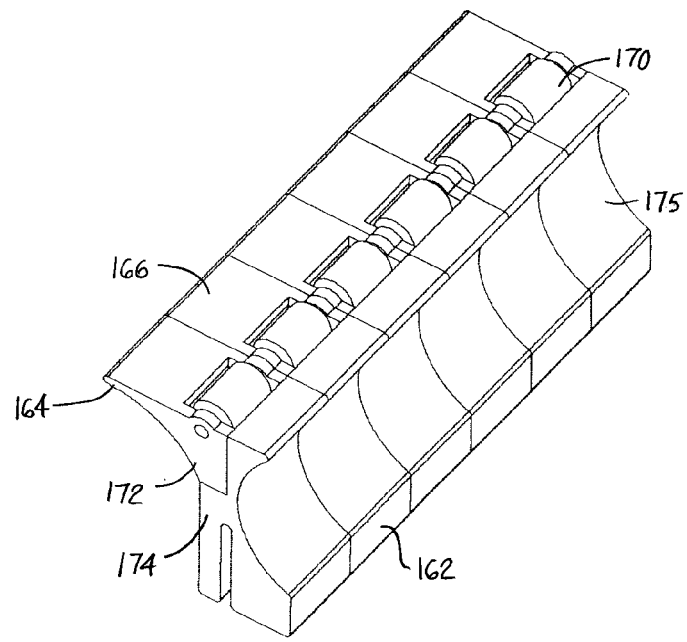
FIG. 14 is an axonometric view of a slotted transfer platform as in FIG. 13 further including transfer rollers in an attachment to a universal base portion of the transfer platform.
Figure 15:
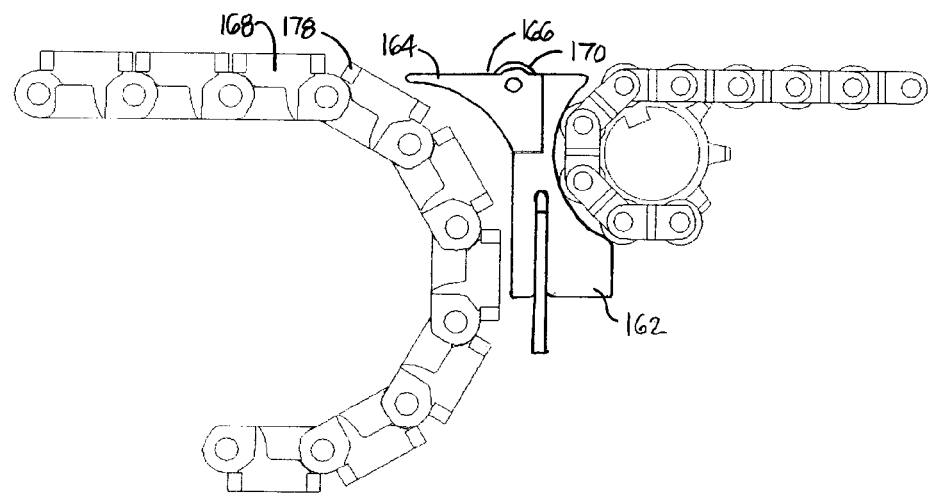
FIG. 15 is a side elevation view of the floating transfer platform of FIG. 14 in a conveyor transfer system.
Figure 16:
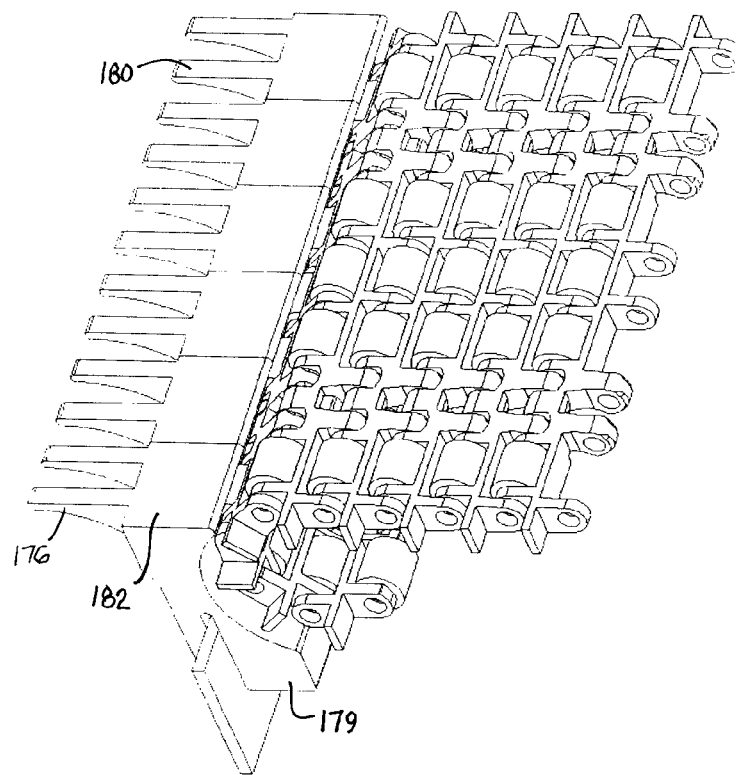
FIG. 16 is an axonometric view of a slotted transfer platform as in FIG. 13 further including fingers along a transfer surface.

Another version of the slotted transfer platform of FIG. 13 is shown in FIGS. 14 and 15. In this example, the transfer platform 162 includes a cantilevered projection 164 that extends the top transfer face 166 farther outward toward a conveyor belt 168 on one side of the platform. The extended top transfer face is shown further with rollers 170 protruding slightly above the top transfer face to help roll articles across the gap. The tops of the rollers form a transfer surface for articles traversing the transfer face. The projecting portion of the transfer platform may be formed monolithically with the rest of the platform or be a separate replaceable attachment 172 that fits into a base portion 174 of the platform. In this way, a variety of detachable attachments, such as finger plates or flat plates with or without rollers, may be mounted on the universal base portion 174. The base portion includes a concave side face 175, and the attachment 172 includes a portion of the top transfer face 166. And, as shown in FIG. 16, the cantilevered projection may include individual fingers 176 that extend into the spaces between laterally spaced raised ribs 178 of a raised-rib conveyor belt as in FIG. 15 to strip articles from the belt onto the top transfer surface of the platform 179. The tops 180 of the fingers 176 define an extension of the top transfer face 182.

Figure 17:
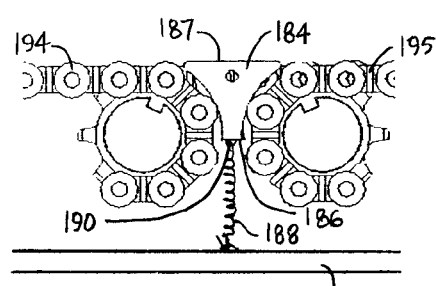
FIG. 17 is a side elevation view of another version of a transfer platform including a hold-down spring.

Another version of a transfer platform is shown in FIG. 17. The platform 184 is T-shaped with a truncated bottom portion 186 opposite a top transfer face 187. An extension spring 188 is hooked between a loop 190 on the bottom portion of the platform and a loop or hole formed in a portion of the conveyor frame 192. The spring holds the platform in the gap. The two conveyor belts 194, 195 provide vertical support to keep the top transfer face 187 generally coplanar with the tops of the belts.

Figure 18:
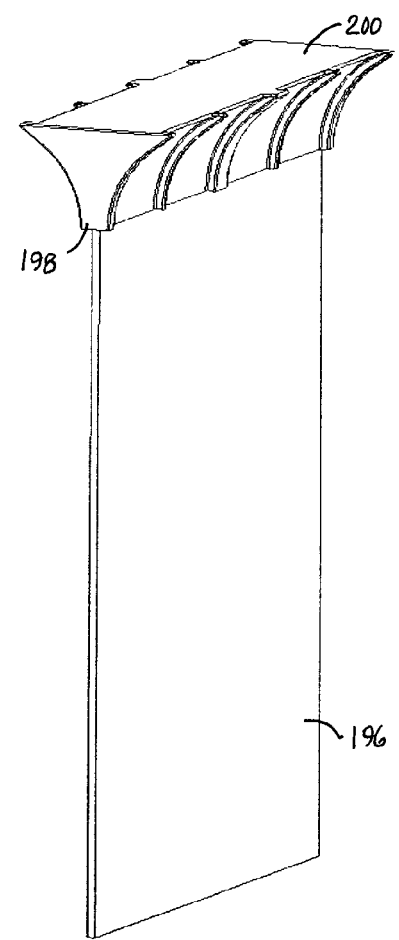
FIG. 18 is an axonometric view of yet another version of a transfer platform usable in a conveyor transfer system as in FIG. 1, including a weighted bottom.

Another version of a T-shaped transfer platform is shown in FIG. 18. In this example, a weighted plate 196 is attached to a bottom portion 198 of the transfer platform 200. The weighted portion substitutes gravity for the spring tension as the hold-down force for the transfer platform.

Figure 19:
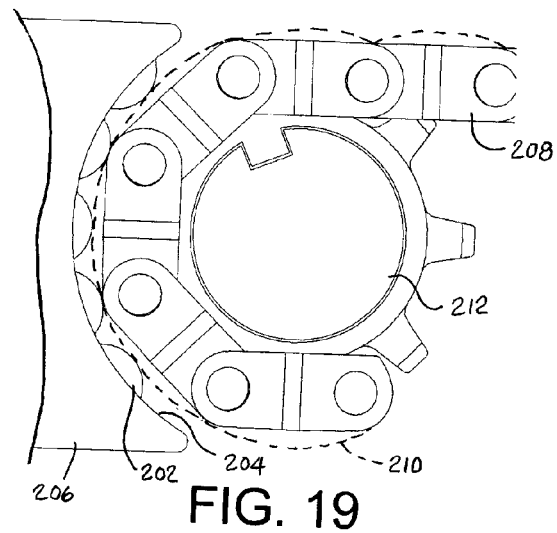
FIG. 19 is a side elevation view of another version of a transfer platform, including rollers along a side face at the platform for contacting a conveyor belt in rolling friction.

Yet another version of the transfer platform is shown in FIG. 19. This version has a plurality of rollers 202 extending outward of a concave arcuate side face 204 of the platform 206 and is useful in minimizing friction with a conveyor belt 208 that does not have rollers on the outside. Alternatively, the belt could be a rollerless belt with a curved top surface 210 that defines a generally circular convex outer conveying surface as the belt articulates about a reversing element 212 that matches the concave tangent to all the rollers 202 protruding from the transfer platform provides a less bumpy, smoother ride than a flat-top belt. And the curved-top belt may, in many instances, work well even with a transfer platform having an arcuate smooth side face as in FIG. 2.

Figure 20:
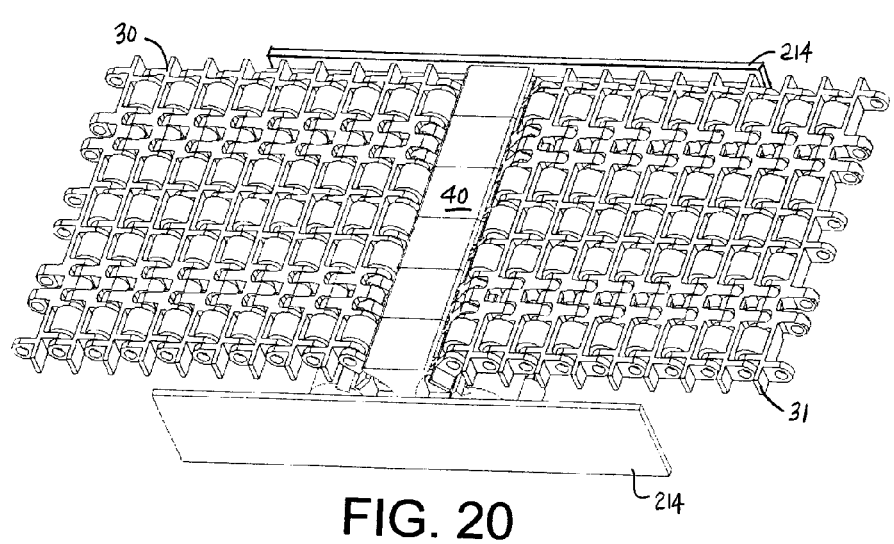
FIG. 20 is an axonometric view of a portion of a conveyor transfer system as in FIG. 1 further including a restraining rail to limit the wander of the floating transfer platform.

Ridges or ribs on the concave side faces of the transfer platforms used with roller belts have been shown to prevent those platforms from wandering laterally in the gap. Another way to limit the lateral wander is with retainers 214 flanking the gap on opposite sides of the upstream and downstream conveyors 30, 31. The retainers, which may be a variety of shapes, are shown in FIG. 20 as plates, which would be attached to the conveyor frame. The retainer plates restrict the lateral extent of travel of the floating transfer platform 40 along the gap.

Figure 21:
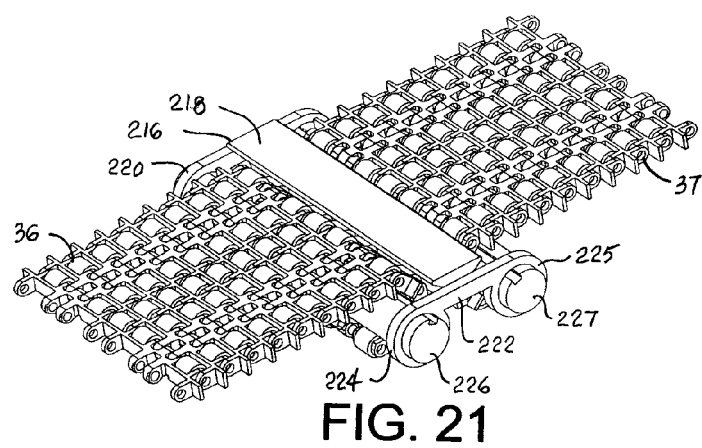
FIG. 21 is an axonometric view of another version of a transfer conveyor system, including an attachment to drive or idle shafts at the ends of confronting conveyor belts.

Another version of a conveyor transfer system is shown in FIG. 21. In this version, a transfer platform 216 having a top transfer face 218 is attached at laterally opposite ends to yokes 220 flanking the gap between upstream and downstream conveyor belts 36, 37. Each yoke comprises a beam 222 terminating at opposite ends in retention elements, such as bows 224, 225 that engage the shafts 226, 227 that form the reversing elements of the two belts. The retention elements may completely encircle the shafts, as the bows do, or conform to only enough of the peripheries of the shafts necessary to retain the yoke in place. The shafts are free to rotate within the bows. The ends of the transfer platform are attached to the beams of the yokes. Thus, in this version, the transfer platform is supported not by the belts, but by the reversing elements. But, like a platform supported by one or both belts, the transfer platform 216 supported by the reversing elements floats with the conveyor belts relative to the fixed conveyor frame and is likewise self-adjusting.

Figure 22:
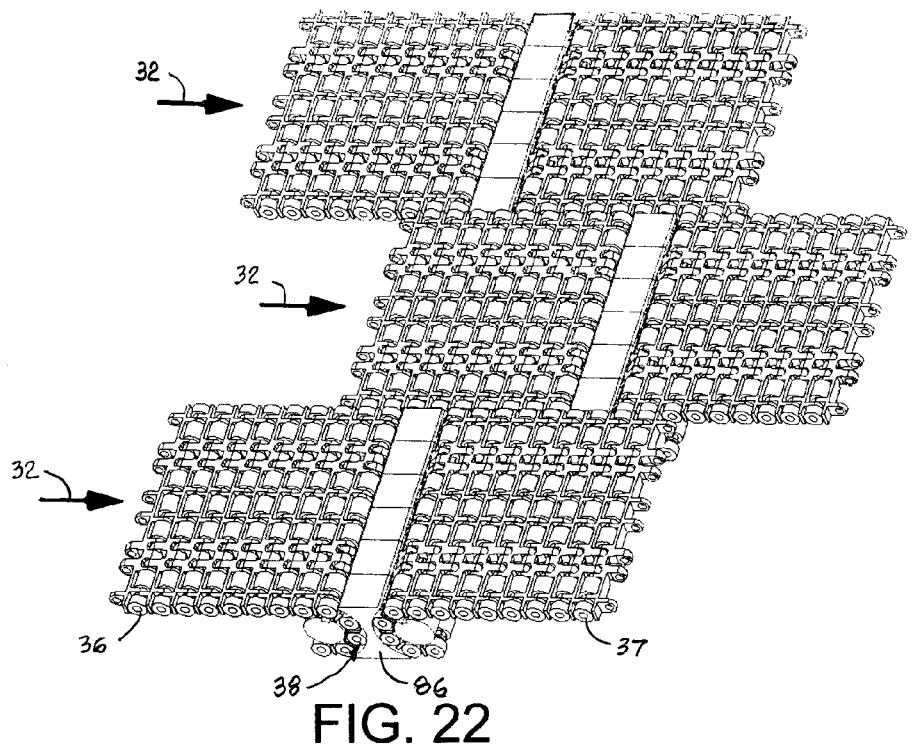
FIG. 22 is an axonometric view of three side-by-side conveyor transfer systems as in FIG. 1, in which the transfer platforms are staggered.
Figure 23:
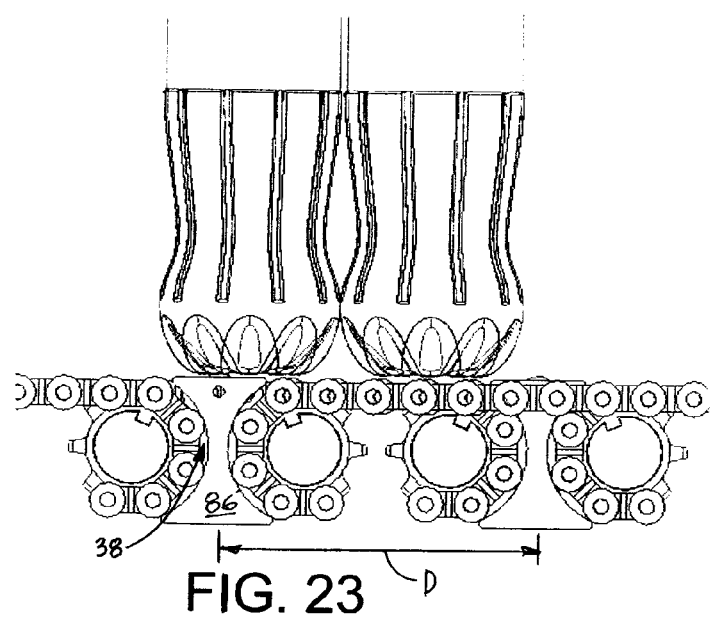
FIG. 23 is a side elevation view of a portion of the conveyor transfer system of FIG. 22.

Another version of a conveyor transfer system is shown in FIGS. 22 and 23. In this version, three transfer conveyors as in FIG. 1 are shown side by side in parallel, all advancing in the conveying direction 32. The gaps 38 and, consequently, the transfer platforms 86 between upstream and downstream conveyor belts 36, 37 are offset in the conveying direction a distance D from the gaps and platforms of its neighboring conveyors. This staggering of the transfer platforms reduces the incidence of stranded articles, especially those large enough to span at least two side-by-side conveyors.

The transfer platforms described could be made of plastic by injection molding or machining or could be made of metal or other materials. The conveyor belts described are modular plastic conveyor belts comprising modules linked together at hinge joints, but the belts could be made of metal or could be hingeless, flexible flat belts. And some of the transfer platforms described may be used with a belt conveyor on one side and another kind of conveyor on the other side. The features of the transfer platforms in the transfer system were shown in specific combinations for purposes of disclosing those features, but one skilled in the art will recognize that those features may be used in combinations other than those shown by way of example.

What is claimed is:

1. A conveyor transfer system comprising:
   a first conveyor including a first conveyor belt advancing articles in a conveying direction;
   a second conveyor arranged end to end with the first conveyor across a gap and advancing the articles in the conveying direction;
   a transfer platform disposed in the gap between the first and second conveyors and having a top transfer face traversed by articles transferring between the first conveyor and the second conveyor in the conveying direction and a bottom portion disposed on a bottom side of the gap and opposite the top transfer face, wherein the maximum dimension of the transfer face and the maximum dimension of the bottom portion in the conveying direction are greater than the narrowest dimension of the gap in the conveying direction;
   wherein the first conveyor belt supports the transfer platform in the gap.

2. A conveyor transfer system as in claim 1 wherein the top transfer face is a flat surface.

3. A conveyor transfer system as in claim 1 wherein the top transfer face is discontinuous.

4. A conveyor transfer system as in claim 1 wherein the transfer platform includes one or more rollers rotatable in the conveying direction extending above the top transfer face to provide rolling support to the articles transferring between the first conveyor and the second conveyor.

5. A conveyor transfer system as in claim 4 wherein the rollers are driven to rotate in the conveying direction.

6. A conveyer system as in claim 5 further comprising magnets in the rollers and a magnetic drive acting on the magnets in the rollers to rotate the rollers in the conveying direction.

7. A conveyor transfer system as in claim 4 wherein the transfer platform further includes a gear engaging the rollers and the first conveyor belt, wherein the advancement of the first conveyor belt rotates the gear and thereby the rollers.

8. A conveyor transfer system as in claim 1 wherein the transfer platform has an hourglass shape.

9. A conveyor transfer system as in claim 1 wherein the transfer platform includes a pair of detachable portions, a top portion including the top transfer face disposed in the upper portion of the gap and a bottom portion disposed in the lower portion of the gap.

10. A conveyor transfer system as in claim 1 wherein the bottom portion is weighted.

11. A conveyor transfer system as in claim 1 further including an extension spring, wherein one end of the extension spring is attached to the bottom portion and the other end is attached to a conveyor frame.

12. A conveyor transfer system as in claim 1 wherein the transfer platform further includes fingers extending along the conveying direction from the top transfer face, the tops of the fingers defining an extension of the top transfer face.

13. A conveyor transfer system as in claim 1 wherein the transfer platform further includes a first side face and an opposite second side face extending downward from the top transfer face to the bottom portion, wherein at least one of the first and second side faces defines a concave arcuate surface.

14. A conveyor transfer system as in claim 13 wherein the concave arcuate surface includes arcuate ribs.

15. A conveyor transfer system as in claim 13 wherein the first conveyor belt includes rollers along a conveying side that roll on the concave arcuate surface of the transfer platform.

16. A conveyor transfer system as in claim 13 wherein the first conveyor belt has a convex outer conveying surface that matches the curvature of the concave arcuate surface for smooth sliding contact.

17. A conveyor transfer system as in claim 13 wherein the concave arcuate surface extends over an arc of between 90° and 180°.

18. A conveyor transfer system as in claim 13 wherein the transfer platform further includes a plurality of rollers extending outward of the concave arcuate surface into contact with the first conveyor belt.

19. A conveyor transfer system as in claim 18 wherein the first conveyor belt contacting the rollers extending outward of the concave arcuate surface has a convex outer conveying surface contacted by the rollers.

20. A conveyor transfer system as in claim 1 further comprising a wall extending into the gap below the top transfer face and wherein the transfer platform further includes a registration surface slidably contacting the wall and a first concave side face extending downward from the top transfer face to receive the first conveyor belt and to maintain the top transfer face in a predetermined position in the conveying direction.

21. A conveyor transfer system as in claim 20 wherein the transfer platform further comprises a vertical groove bounded on one side by the registration surface.

22. A conveyor transfer system as in claim 20 wherein the transfer platform further comprises a second side opposite the first concave side, the second side forming the registration surface.

23. A conveyor transfer system as in claim 1 further comprising a first retainer and a second retainer flanking the gap on opposite lateral sides of the first and second conveyors to limit the wander of the transfer platform along the gap.

24. A conveyor transfer system as in claim 1 wherein the transfer platform includes first and second legs extending downward opposite the top transfer face, wherein the first leg is bendable from a relaxed position in which the first leg curves toward the first conveyor to a retracted position in which the first leg is vertical and wherein the second leg is bendable from a relaxed position in which the second leg curves toward the second conveyor to a retracted position in which the second leg is vertical.

25. A conveyor transfer system as in claim 1 wherein the second conveyor includes a second conveyor belt arranged end to end with the first conveyor belt.

26. A conveyor transfer system as in claim 25 further comprising:
a third conveyor having a third conveyor belt advancing articles in the conveying direction;
a fourth conveyor having a fourth conveyor belt arranged end to end with the third conveyor belt across a second gap to transfer the articles between the third and fourth conveyor belts and advance the articles further in the conveying direction, the third and fourth conveyor belts being arranged parallel to and side by side with the first and second conveyor belts with the gap between the first and second conveyor belts offset in the conveying direction from the second gap between the third and fourth conveyor belts;
a second transfer platform disposed in the second gap between the third and fourth conveyor belts and having a top transfer face traversed by articles transferring from the first conveyor belt to the second conveyor belt;
wherein at least one of the third and fourth conveyor belts supports the second transfer platform in the second gap.

27. A conveyor transfer system comprising:
a first conveyor belt advancing articles along a carryway in a conveying direction toward an exit end of the first conveyor belt;
a second conveyor belt having an entrance end adjacent to the exit end of the first conveyor belt across a gap to receive the articles from the first conveyor belt and advance the articles along the carryway further in the conveying direction;
a first reversing element at the exit end of the first conveyor belt, wherein the first conveyer belt reverses direction around the first reversing element from the carryway to a lower returnway;
a second reversing element at the entrance end of the second conveyor belt, wherein the second conveyer belt reverses direction around the second reversing element from a lower returnway to the carryway;
a transfer platform disposed in the gap between the first and second conveyor belts and having a transfer surface supporting the articles transferring from the first conveyor belt to the second conveyor belt and a bottom portion disposed on a bottom side of the gap and opposite the transfer surface, wherein the maximum dimension of the transfer surface and the maximum dimension of the bottom portion in the conveying direction are greater than the narrowest dimension of the gap in the conveying direction;
wherein at least one of the first conveyor belt, the second conveyor belt, the first reversing element, and the second reversing element supports the transfer platform in the gap.

28. A conveyor transfer system as in claim 27 further comprising a first yoke and a second yoke flanking the gap on opposite lateral sides of the first and second conveyor belts, each of the first and second yokes including a beam terminating at opposite ends in first and second retention elements engaging the first and second reversing elements, wherein the transfer platform is attached at opposite ends to the beams of the first and second yokes to be supported in the gap by the first and second reversing elements.

29. A conveyor transfer system as in claim 27 wherein at least one of the first and second reversing elements comprises a rotatable shaft having sprockets or wheels mounted thereon engaging one of the first and second conveyor belts.

30. A conveyor transfer system as in claim 27 wherein at least one of the first and second reversing elements comprises a nosebar about which one of the first and second conveyor belts articulates between the carryway and the returnway.

31. A transfer platform comprising:
a top article transfer face having first and second ends;
a bottom portion opposite the top article transfer face;
a concave side face extending downward from the first end of the top article transfer face to the bottom portion and having a contact surface for contact with a conveyor belt reversing direction between an upper path and a lower path;
wherein the maximum dimension of the top article transfer face in a conveying direction from the first end to the second end and the maximum dimension of the bottom portion in the conveying direction are greater than the narrowest dimension of the transfer platform between the top article transfer face and the bottom portion in the conveying direction.

32. A transfer platform as in claim 31 wherein the top article transfer face is a flat surface.

33. A transfer platform as in claim 31 wherein the top article transfer face is discontinuous.

34. A transfer platform as in claim 31 further comprising one or more rollers rotatable in the conveying direction extending above the top article transfer face to provide rolling support to articles traversing the top article transfer face.

35. A transfer platform as in claim 34 further comprising means for rotating the rollers.

36. A transfer platform as in claim 35 wherein the means for rotating the rollers includes magnets in the rollers and a magnetic drive acting on the magnets in the rollers to rotate the rollers.

37. A transfer platform as in claim 35 wherein the means for rotating the rollers includes a gear system engaging the rollers and extending outward of the concave side face.

38. A transfer platform as in claim 31 wherein the transfer platform has an hourglass shape.

39. A transfer platform as in claim 31 comprising a pair of detachable portions, a top portion including the top article transfer face and the bottom portion.

40. A transfer platform as in claim 31 wherein the bottom portion is weighted.

41. A transfer platform as in claim 31 further comprising fingers extending from the top article transfer face, the tops of the fingers defining an extension of the top article transfer face.

42. A transfer platform as in claim 31 further comprising an opposite second side face extending downward from the second end of the top article transfer face.

43. A transfer platform as in claim 31 wherein the concave side face is arcuate.

44. A transfer platform as in claim 43 further comprising arcuate ribs formed on the arcuate concave side face.

45. A transfer platform as in claim 43 wherein the concave arcuate face extends over an arc of between 90° and 180°.

46. A transfer platform as in claim 31 further comprising a plurality of rollers extending outward of the concave side face.

47. A transfer platform as in claim 31 further comprising first and second legs extending downward opposite the top article transfer face, wherein the first leg is bendable from a relaxed position in which the first leg curves under the first end of the top article transfer face to a retracted position in which the first leg is vertical and wherein the second leg is bendable from a relaxed position in which the second leg curves under the second end of the top article transfer face to a retracted position in which the second leg is vertical.

48. A transfer platform as in claim 31 comprising:
a base portion that includes the concave side face; and
an attachment that includes at least a portion of the top transfer face and that detachably mounts to the base portion.

\* \* \* \* \*